United States Patent
Gilbertson et al.

(10) Patent No.: US 10,902,075 B2
(45) Date of Patent: Jan. 26, 2021

(54) TARGETED CONTENT FOR SIMULTANEOUS MULTI-USERS FOR A SHARED DEVICE

(71) Applicant: International Business Machines Corporation, Armonk, NY (US)

(72) Inventors: Kyle Gilbertson, Rochester, MN (US); Igar Shepelev, Rochester, MN (US); Blair Wyman, Rochester, MN (US); Jim Coon, Rochester, MN (US); Aaron C Evans, Rochester, MN (US); Cary Huettner, Rochester, MN (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 143 days.

(21) Appl. No.: 16/196,115

(22) Filed: Nov. 20, 2018

(65) Prior Publication Data

US 2020/0159864 A1 May 21, 2020

(51) Int. Cl.
*G06F 16/9535* (2019.01)
*G06K 9/00* (2006.01)
*G06F 16/248* (2019.01)

(52) U.S. Cl.
CPC ........ *G06F 16/9535* (2019.01); *G06F 16/248* (2019.01); *G06K 9/00295* (2013.01)

(58) Field of Classification Search
CPC .............. G06F 16/9535; G06F 16/248; G06K 9/00295
USPC ........................................................ 707/722
See application file for complete search history.

(56) References Cited

U.S. PATENT DOCUMENTS

| 8,046,797 | B2 | 10/2011 | Bentolila et al. |
| 9,141,617 | B1* | 9/2015 | Gargi .................. G06F 16/9535 |
| 2007/0072676 | A1 | 3/2007 | Baluja |
| 2010/0111085 | A1 | 5/2010 | Bauchot et al. |
| 2012/0304208 | A1* | 11/2012 | McWilliams .......... G06Q 30/00 725/14 |
| 2013/0198006 | A1 | 8/2013 | Santhiveeran et al. |

(Continued)

OTHER PUBLICATIONS

Anonymous; "System to monitor an audience's attention during a live presentation"; ip.com—IPCOM000250163D; Jun. 7, 2017; 3 pages.

(Continued)

*Primary Examiner* — Robert W Beausoliel, Jr.
*Assistant Examiner* — Arthur Ganger
(74) *Attorney, Agent, or Firm* — Cantor Colburn LLP; Teddi Maranzano

(57) ABSTRACT

Embodiments of the present invention are directed to a computer-implemented method for serving content. A non-limiting example of the computer-implemented method includes identifying, using a processor, a first user and a second user among a group of users viewing a display. Next, the method includes examining, using the processor, known information about the first user and the second user. The method includes computing a content profile, using the processor, based on the known information about the first user and the second user. The method further includes selecting relevant content, using the processor, to display to the group based on the content profile and presenting, using the processor, the relevant content to the group of users.

20 Claims, 4 Drawing Sheets

(56) References Cited

U.S. PATENT DOCUMENTS

2014/0052534 A1* 2/2014 Gandhi ............... G06Q 50/01
705/14.58
2014/0136333 A1 5/2014 Shoshitaishvili et al.
2014/0372430 A1* 12/2014 Sitruk ............... G06F 16/337
707/736
2016/0127775 A1 5/2016 Zilberstein et al.

OTHER PUBLICATIONS

Anonymous; "Method and Apparatus for Integrating Online Social Media in TV as a Service"; IP.com—IP.com No. IPCOM000197674D; Jul. 19, 2010; 4 pages.
Anonymous; "Vector Space Model" Wikipedia <https://en.wikipedia.org/wiki/Vector_space_model>, Saved from the World Wide Web on Nov. 14, 2018; 5 pages.
Hargrave; "Facial recognition—a powerful ad tool or privacy nightmare?"; The Guardian Media Network; Aug. 2016; 5 pages.
Klosowski; "How Facebook Uses Your Data to Target Ads, Even Offline"; <https://lifehacker.com/5994380/how-facebook-uses-your-data-to-target-ads-even-offline>; Apr. 11, 2013; 8 pages.
Mell et al.; "The NIST Definition of Cloud Computing—Recommendations of the National Institute of Standards and Technology"; U.S. Department of Commerce; Sep. 2011; 7 pages.

* cited by examiner

TARGETED CONTENT FOR SIMULTANEOUS MULTI-USERS FOR A SHARED DEVICE

BACKGROUND

The present invention generally relates to targeting content to users and more specifically, to targeted content for simultaneous multi-users for a shared device.

Entertainment and content are moving rapidly away from a TV/Radio broadcast model that's not very personalized to a more on-demand Internet-based model. This has opened up the ability to track a person who looks at online content and to profile their interests and buying preferences. Typically, content is targeted solely based on who is logged in to the system.

SUMMARY

Embodiments of the present invention are directed to a computer-implemented method for serving content. A non-limiting example of the computer-implemented method includes identifying, using a processor, a first user and a second user among a group of users viewing a display. Next, the method includes examining, using the processor, known information about the first user and the second user. The method includes computing a content profile, using the processor, based on the known information about the first user and the second user. The method further includes selecting relevant content, using the processor, to display to the group based on the content profile and presenting, using the processor, the relevant content to the group of users.

Embodiments of the present invention are directed to a system for serving content. A non-limiting example of the system includes a memory and a processor communicatively coupled to the memory. The processor is operable to execute instructions stored in the memory. The instructions cause the processor to identify, using the processor, a first user and a second user among a group of users viewing a display. The instructions examine, using the processor, known information about the first user and the second user and computes a content profile, using the processor, based on the known information about the first user and the second user. The instructions select relevant content, using the processor, to display to the group based on the content profile and presents, using the processor, the relevant content to the group of users.

Embodiments of the invention are directed to a computer program product for serving content. The computer program product comprising a computer readable storage medium having program instructions embodied therewith. The program instructions are executable by a processor to cause the processor to perform a method. A non-limiting example of the method includes identifying, using a processor, a first user and a second user among a group of users viewing a display and examining, using the processor, known information about the first user and the second user. The method computes a content profile, using the processor, based on the known information about the first user and the second user. The method selects relevant content, using the processor, to display to the group based on the content profile and presents, using the processor, the relevant content to the group of users.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
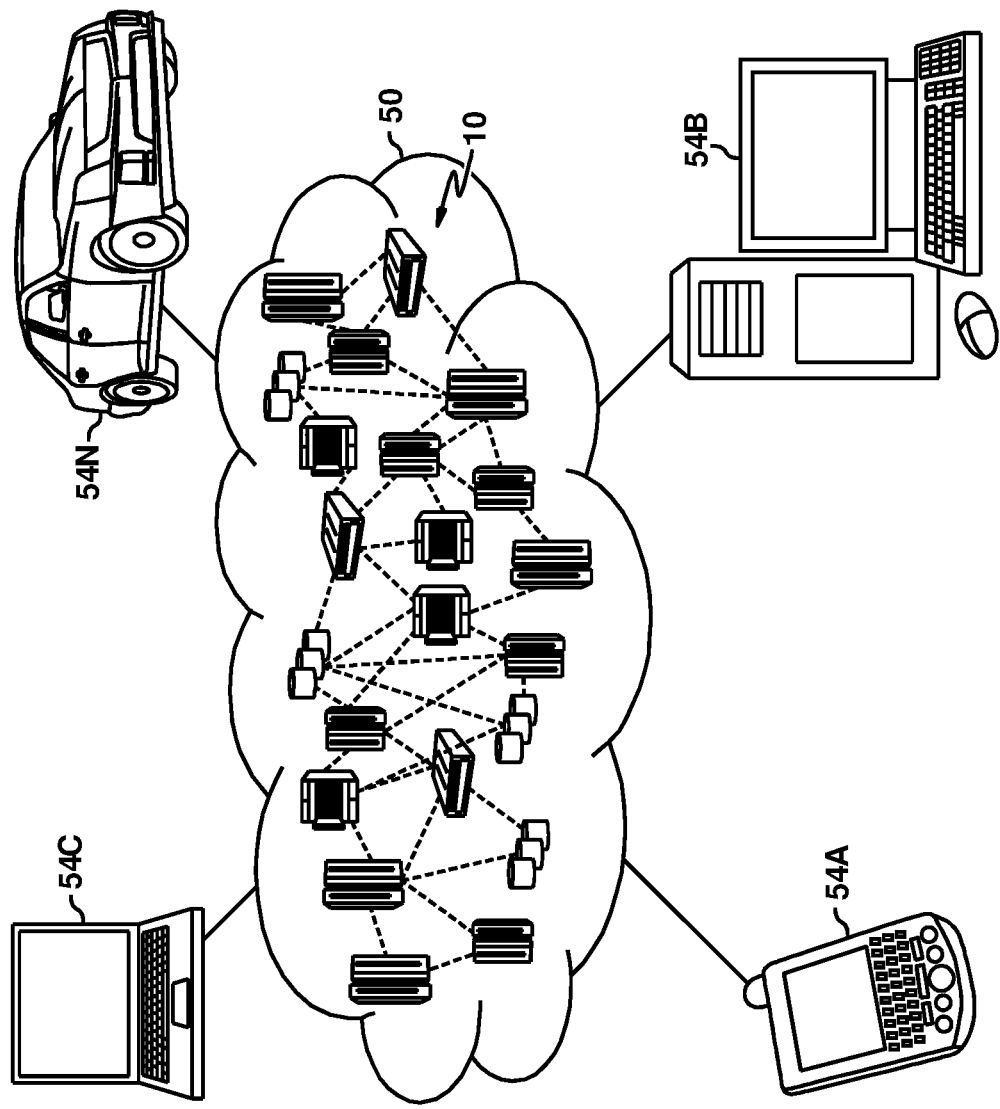
FIG. 1 depicts a cloud computing environment according to an embodiment of the present invention.

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two or three digit reference numbers. With minor exceptions, the leftmost digit(s) of each reference number correspond to the figure in which its element is first illustrated.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
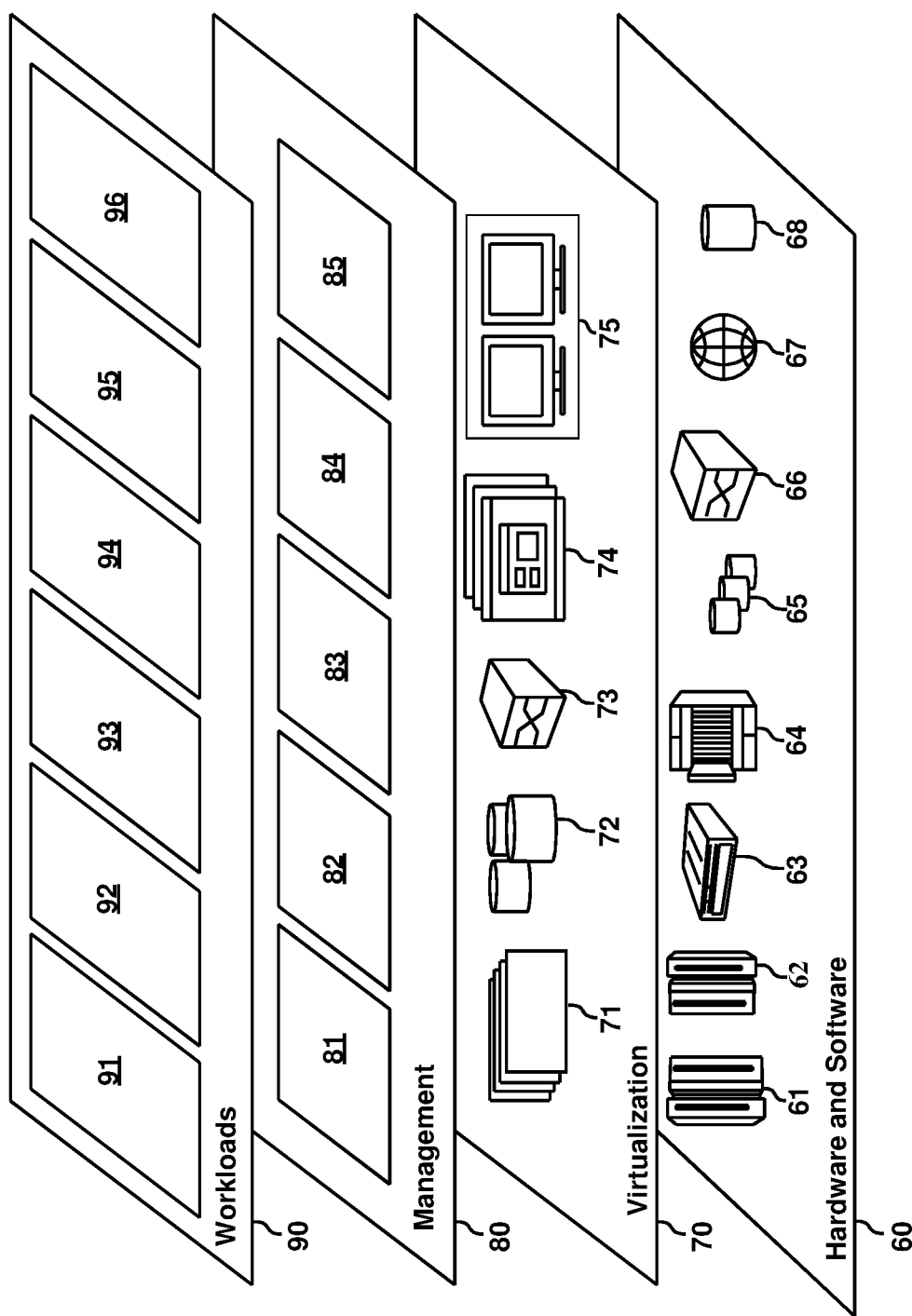
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and user-targeted content 96.

Turning now to an overview of technologies that are more specifically relevant to aspects of the invention, entertainment and content are moving rapidly away from a TV/Radio broadcast model that's not very personalized to a more on-demand Internet-based model. This has opened up the ability to track a person who looks at online content and to profile their interests and buying preferences. Typically, content is targeted solely based on who is logged in to the system. This limitation misses an opportunity to consider the whole viewing audience as a group of potential consumers of content. Through detection of multiple users at the same time, and the aggregation of their preferences and interests from previously established sources, one can more accurately target content to members other than the one who is logged into the system.

Turning now to an overview of the aspects of the invention, one or more embodiments of the invention address the above-described shortcomings of the prior art by providing a solution that involves aggregating the inputs from one or more different sources in order to detect users and to determine who is watching a screen on a device, such as a television, phone, tablet, or computer monitor. Facial recognition from camera devices, such as webcams that are built into televisions, computer gaming consoles, mobile devices, and streaming devices are examples of such an input. Once a logged-in user's guests are identified as also watching the device, their online content profiles are examined.

For example, some guests may have Hulu profiles that Hulu can mine for data such as their picture and viewing habits. This profile may link to other profiles, such as Facebook, which the content provider may also have permission to access. Hulu can partner with other companies to access more information about the users via Google ads, for example, or Facebook tracking. The logged-in user's guests may not have pictures of themselves in their profiles, but externally available information, or data that a service such as Hulu collects while the logged-in user is at home watching shows can be collected to help identify the guests. With that information, an aggregate data set of preferences is created. Then, the system uses that data to choose content that addresses a logged-in user's guests, and not just the logged-in user himself.

The above-described aspects of the invention address the shortcomings of the prior art by providing content that is delivered to people more receptive to hear it, or to a group who have not heard it before. To the logged-in user and his guests, the content would be more relevant and less annoying. For example, if the logged-in user and his guests are teenagers, they will not see content intended for a more mature audience, such as a Life Alert content—even if the show they were watching was popular with an older audience. On the other hand, of the logged-in user and his friends are in their 40's with aging parents, Life Alert content would be an appropriate content to provide.

Figure 3:
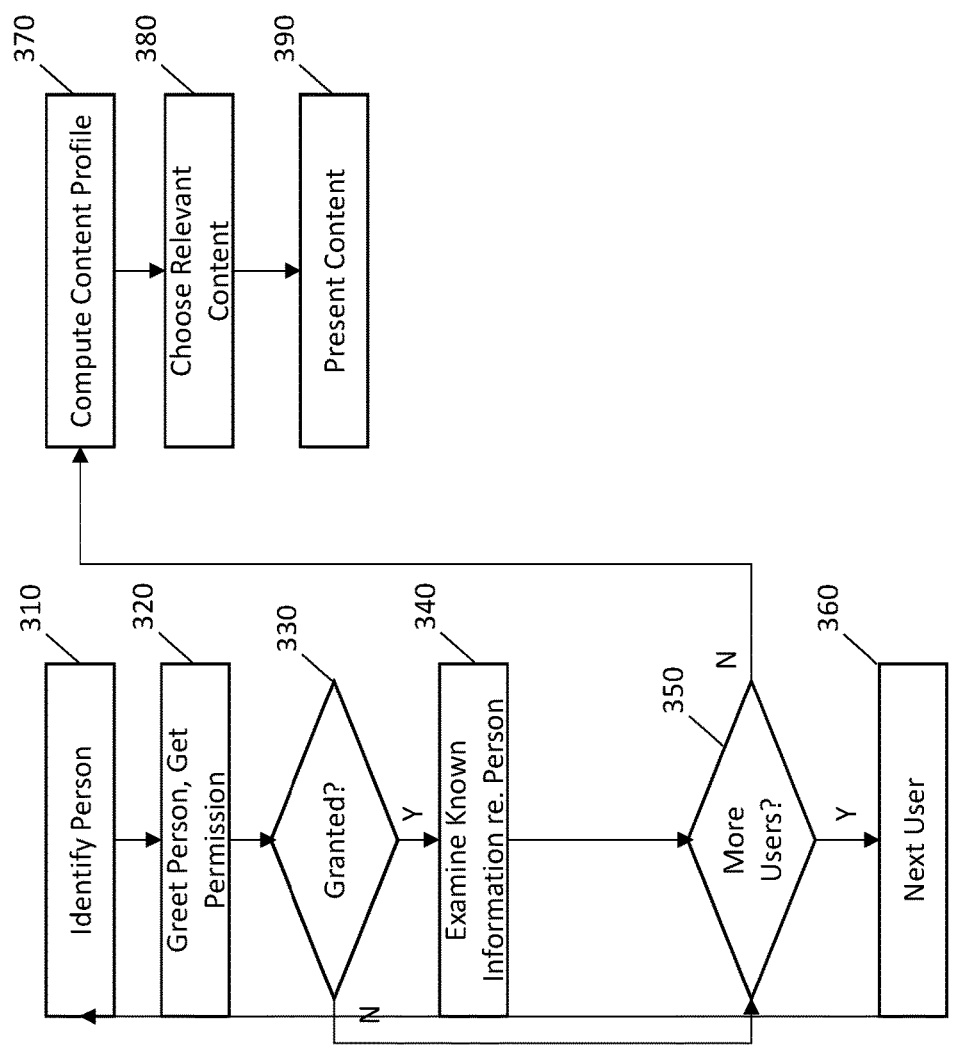
FIG. 3 depicts a flowchart for targeting content at a plurality of users according to embodiments of the invention.

Turning now to a more detailed description of aspects of the present invention, FIG. 3 depicts a flowchart for targeting content at a plurality of users according to embodiments of the invention. Initially, a first person among a group of people viewing a device, e.g., a television, a pad, or a mobile device, is selected and identified (stage 310). The person is identified by way of facial recognition, for example. In an alternative, the person could be identified by having her log into the device. The facial recognition may come from facial features maintained in a variety of databases, such as Facebook, Instagram, or Twitter. The identified person is then greeted by the device and is asked to give permission to become part of a viewing group (stage 320). If permission is granted (stage 330), flow continues to stage 340 where known information about the identified person is gathered and examined. If permission is not granted, flow continues to stage 350. The known information may come from databases maintained by a content provider who owns the data, such as Hulu, for example. The known information may also come from online profiles to which the content provider has access, for example, Facebook, Instagram, and Twitter information. The known information is gathered and examined.

Next, a check is made to see if there are more users or persons in the room who have not yet been identified (stage 350). If there are more users, the next user is selected (stage 360) and flow returns to stage 310. If there are no more users, a content profile for the group of users is computed (stage 370). In order to compute the content profile, each identified person's known information is established as an individual data vector. The individual data vectors for each person are aggregated into a model such as a vector space model where differences between the individual vectors are measured geometrically in order to form an aggregate vector for the group. This aggregate vector is the metric that is used in the calculation of content affinity for the willing group as a whole.

Next, relevant content is chosen based on the model/aggregate vector for the group (stage 380). The content provider may choose relevant content based on performing a best match of the model/aggregate vector against a range of potential content to determine the most relevant content. Alternatively, clustering can be used to model the overlap of the properties of the model/aggregate vector and the content that is intended to target the aggregated group profile. Finally, the chosen content is presented to the group (stage 390). The method described with respect to FIG. 3 may be implemented by a single computer, multiple computers, or through a cloud-based service.

Figure 4:
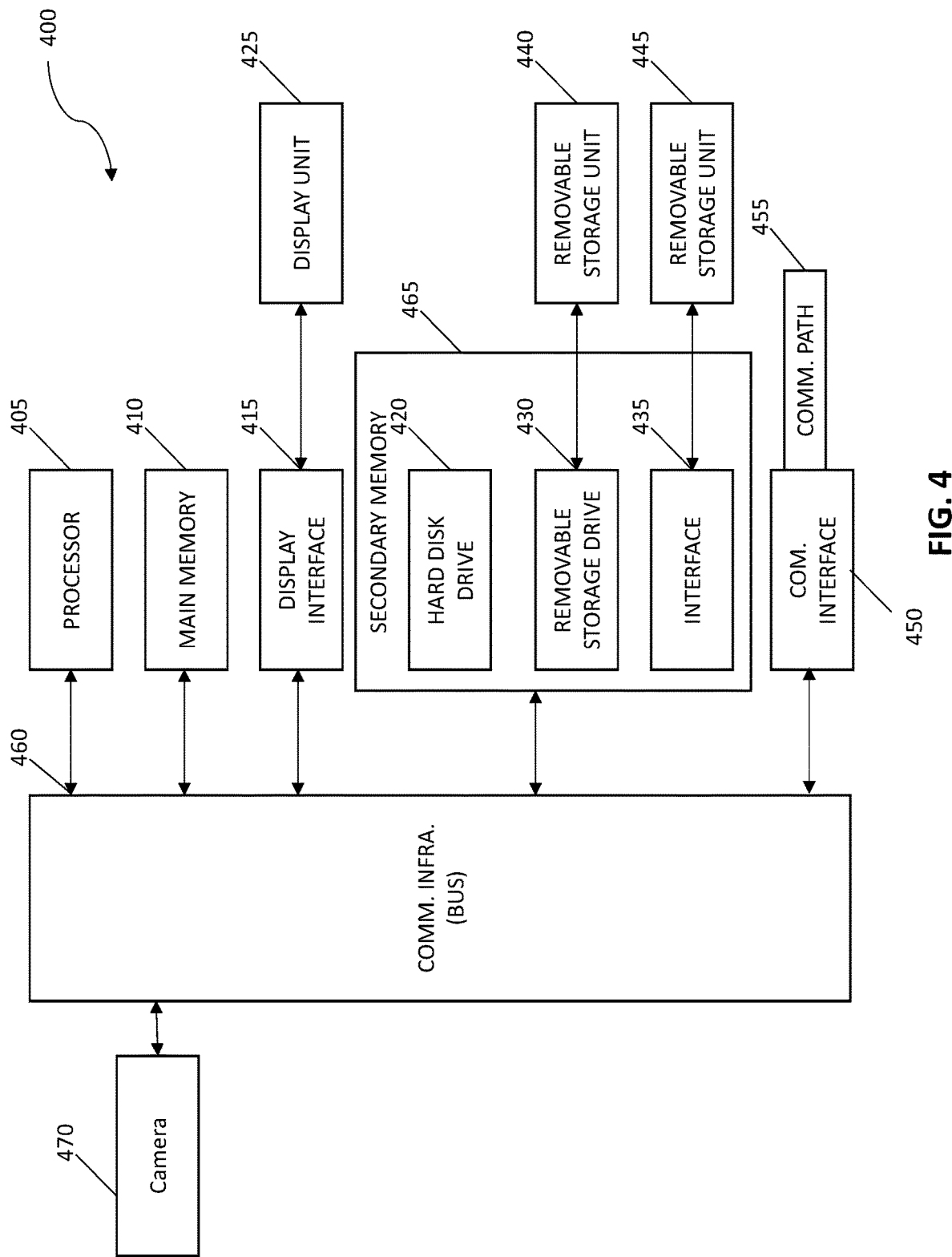
FIG. 4 depicts details of an exemplary computing system capable of implementing aspects of the invention.

FIG. 4 depicts details of an exemplary computing system capable of implementing aspects of the invention. FIG. 4 depicts a high level block diagram computer system 400, which can be used to implement one or more aspects of the present invention. Computer system 400 may act as a media device and implement the totality of the invention or it may act in concert with other computers and cloud-based systems to implement the invention. More specifically, computer system 400 can be used to implement some hardware components of embodiments of the present invention. Although one exemplary computer system 400 is shown, computer system 400 includes a communication path 455, which connects computer system 400 to additional systems (not depicted) and can include one or more wide area networks (WANs) and/or local area networks (LANs) such as the Internet, intranet(s), and/or wireless communication network(s). Computer system 400 and additional system are in communication via communication path 455, e.g., to communicate data between them.

Computer system 400 includes one or more processors, such as processor 405. Processor 405 is connected to a communication infrastructure 460 (e.g., a communications bus, cross-over bar, or network). Computer system 400 can include a display interface 415 that forwards graphics, text, and other data from communication infrastructure 460 (or from a frame buffer not shown) for display on a display unit 425. Computer system 400 also includes a main memory 410, preferably random access memory (RAM), and can also include a secondary memory 465. Secondary memory 465 can include, for example, a hard disk drive 420 and/or a removable storage drive 430, representing, for example, a floppy disk drive, a magnetic tape drive, or an optical disk drive. Removable storage drive 430 reads from and/or writes to a removable storage unit 440 in a manner well known to those having ordinary skill in the art. Removable storage unit 440 represents, for example, a floppy disk, a compact disc, a magnetic tape, or an optical disk, etc. which is read by and written to by removable storage drive 430. As will be appreciated, removable storage unit 440 includes a computer readable medium having stored therein computer software and/or data.

In alternative embodiments, secondary memory 465 can include other similar means for allowing computer programs or other instructions to be loaded into the computer system. Such means can include, for example, a removable storage unit 445 and an interface 435. Examples of such means can include a program package and package interface (such as that found in video game devices), a removable memory chip (such as an EPROM, or PROM) and associated socket, and other removable storage units 445 and interfaces 435 which allow software and data to be transferred from the removable storage unit 445 to computer system 400. In addition, a camera 470 is in communication with processor 405, main memory 410, and other peripherals and storage through communications interface 460.

Computer system 400 can also include a communications interface 450. Communications interface 450 allows software and data to be transferred between the computer system and external devices. Examples of communications interface 450 can include a modem, a network interface (such as an Ethernet card), a communications port, or a PCM-CIA slot and card, etcetera. Software and data transferred via communications interface 450 are in the form of signals which can be, for example, electronic, electromagnetic, optical, or other signals capable of being received by communications interface 450. These signals are provided to communications interface 450 via communication path (i.e., channel) 455. Communication path 455 carries signals and can be implemented using wire or cable, fiber optics, a phone line, a cellular phone link, an RF link, and/or other communications channels.

In the present description, the terms "computer program medium," "computer usable medium," and "computer readable medium" are used to generally refer to media such as main memory 410 and secondary memory 465, removable storage drive 430, and a hard disk installed in hard disk drive 420. Computer programs (also called computer control logic) are stored in main memory 410 and/or secondary memory 465. Computer programs can also be received via communications interface 450. Such computer programs, when run, enable the computer system to perform the features of the present invention as discussed herein. In particular, the computer programs, when run, enable processor 405 to perform the features of the computer system. Accordingly, such computer programs represent controllers of the computer system.

Many of the functional units described in this specification have been labeled as modules. Embodiments of the present invention apply to a wide variety of module implementations. For example, a module can be implemented as a hardware circuit comprising custom VLSI circuits or gate arrays, off-the-shelf semiconductors such as logic chips, transistors, or other discrete components. A module can also be implemented in programmable hardware devices such as field programmable gate arrays, programmable array logic, programmable logic devices or the like.

Modules can also be implemented in software for execution by various types of processors. An identified module of executable code can, for instance, include one or more physical or logical blocks of computer instructions which can, for instance, be organized as an object, procedure, or function. Nevertheless, the executables of an identified module need not be physically located together, but can include disparate instructions stored in different locations which, when joined logically together, comprise the module and achieve the stated purpose for the module.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
identifying, using a processor, a first user and a second user among a group of users viewing a display;
requesting permissions from the first user and the second user to become part of a viewing group;
receiving the permissions from the first user and the second user; and
in response to receiving the permissions:
examining, using the processor, known information about the first user and the second user;
computing a content profile, using the processor, based on the known information about the first user and the second user;
selecting relevant content, using the processor, to display to the group based on the content profile; and
presenting, using the processor, the relevant content to the group of users.

2. The computer-implemented method of claim 1, wherein identifying is performed through facial recognition.

3. The computer-implemented method of claim 2, wherein the identifying through facial recognition compares a face of the first user and a face of the second user against a database of facial information.

4. The computer-implemented method of claim 1, wherein examining known information comprises gathering information on the first user and the second user from a plurality of databases.

5. The computer-implemented method of claim 4, further comprising gathering the examined known information into a first data vector for the first user and a second data vector for the second user.

6. The computer-implemented method of claim 5, wherein computing a content profile comprises aggregating the first data vector and the second data vector into an aggregate vector.

7. The computer-implemented method of claim 6, wherein selecting relevant content comprises comparing the aggregate vector to a plurality of potential content.

8. The computer-implemented method of claim 1, wherein selecting relevant content comprises clustering to model overlap between an aggregated profile of the first user and the second user against a target audience for a plurality of content.

9. A system comprising:
a memory;
a processor communicatively coupled to the memory, the processor operable to execute instructions stored in the memory, the instructions causing the processor to perform operations comprising:
identifying, using the processor, a first user and a second user among a group of users viewing a display;
requesting permissions from the first user and the second user to become part of a viewing group;
receiving the permissions from the first user and the second user; and
in response to receiving the permissions:
examining, using the processor, known information about the first user and the second user;
computing a content profile, using the processor, based on the known information about the first user and the second user;
selecting relevant content, using the processor, to display to the group based on the content profile; and
presenting, using the processor, the relevant content to the group of users.

10. The system of claim 9 wherein the instructions further cause the processor to identify the first user and the second user through facial recognition.

11. The system of claim 9, wherein the instructions further cause the processor to compare a face of the first user and a face of the second user against a database of facial information.

12. The system of claim 9, wherein the instructions further cause the processor to gather information on the first user and the second user from a plurality of databases.

13. The system of claim 12, wherein the instructions further cause the processor to gather the examined known information into a first data vector for the first user and a second data vector or other such model for the second user.

14. The system of claim 13, wherein the instructions further cause the processor to aggregate the first data vector and the second data vector into an aggregate vector.

15. The system of claim 14, wherein the instructions further cause the processor to compare the aggregate vector to a plurality of potential content.

16. The system of claim 9, wherein the instructions further cause the processor to use clustering to model overlap between an aggregated profile of the first user and the second user against a target audience for a plurality of content.

17. A computer program product for storing I/O statistics of a data set during initialization of a system, the computer program product comprising a computer readable storage medium having program instructions embodied therewith, the program instructions executable by a computer, to cause the computer to perform a method comprising:
identifying, using a processor, a first user and a second user among a group of users viewing a display;
requesting permissions from the first user and the second user to become part of a viewing group;
receiving the permissions from the first user and the second user; and
in response to receiving the permissions:
examining, using the processor, known information about the first user and the second user;
computing a content profile, using the processor, based on the known information about the first user and the second user;
selecting relevant content, using the processor, to display to the group based on the content profile; and
presenting, using the processor, the relevant content to the group of users.

18. The computer program product of claim 17, wherein the program instructions further cause the computer to identify through facial recognition.

19. The computer program product of claim 17, wherein the program instructions further cause the computer to compare a face of the first user and a face of the second user against a database of facial information.

20. The computer program product of claim 17, wherein the program instructions further cause the computer to gather information on the first user and the second user from a plurality of databases.

\* \* \* \* \*

UNITED STATES PATENT AND TRADEMARK OFFICE
CERTIFICATE OF CORRECTION

| | |
|---|---|
| PATENT NO. | : 10,902,075 B2 |
| APPLICATION NO. | : 16/196115 |
| DATED | : January 26, 2021 |
| INVENTOR(S) | : Kyle Gilbertson et al. |

Page 1 of 1

It is certified that error appears in the above-identified patent and that said Letters Patent is hereby corrected as shown below:

On the Title Page

Item (72) Inventors: should read as follows:
...Kyle Gilbertson, Rochester, MN (US);
Igar Shepelev, Rochester, MN (US);
Blair Wyman, Rochester, MN (US);
James Richard Coon, Rochester, MN (US);
Aaron C. Evans, Rochester, MN (US);
Cary M. Huettner, Rochester, MN (US)

Signed and Sealed this
Eighth Day of June, 2021

Drew Hirshfeld
*Performing the Functions and Duties of the*
*Under Secretary of Commerce for Intellectual Property and*
*Director of the United States Patent and Trademark Office*